(No Model.)
F. P. SNOW.
TREADLE.
No. 261,568. Patented July 25, 1882.
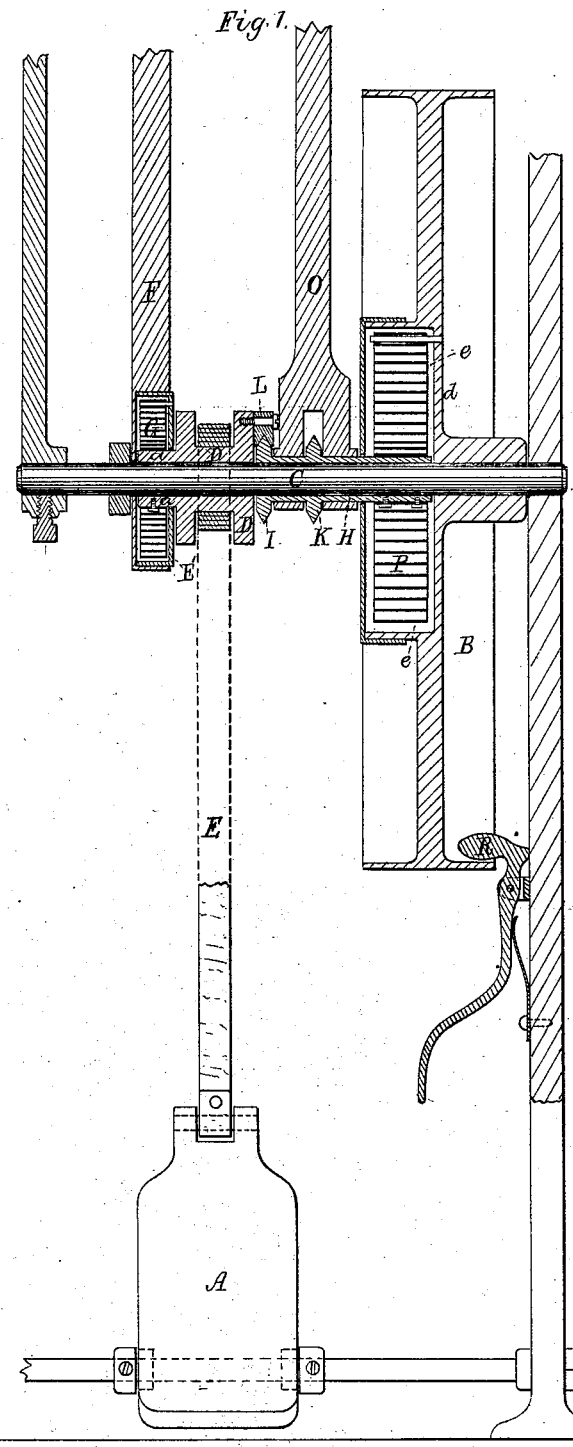
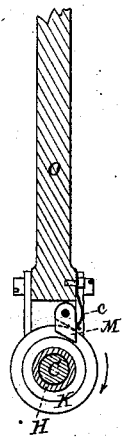
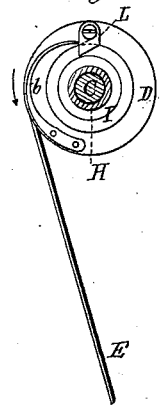
Witnesses
S. N. Piper
E. B. Pratt
Inventor.
Fred. P. Snow
by R. U. Eddy, atty.

UNITED STATES PATENT OFFICE.

FRED PEARLY SNOW, OF ORANGE, MASSACHUSETTS, ASSIGNOR TO HIMSELF AND JAMES H. DODGE, OF SAME PLACE.

TREADLE.

SPECIFICATION forming part of Letters Patent No. 261,568, dated July 25, 1882.

Application filed February 13, 1882. (No model.)

*To all whom it may concern:*

Be it known that I, FRED PEARLY SNOW, of Orange, of the county of Franklin, of the State of Massachusetts, have invented a new and useful improvement in treadle-motions or mechanism for revolving by means of a treadle a wheel or ordinary pulley for a sewing or other machine; and I do hereby declare the same to be described in the following specification and represented in the accompanying drawings, of which—

Figure 1 is a vertical and longitudinal section of mechanism embodying my invention. Figs. 2 and 3 are transverse sections, showing its impelling and retaining pawls and their angular-edge wheels, to be described. The plane of section of Fig. 2 is between the wheel I and the hanger O, hereinafter described, the plane of section of Fig. 3 being through the middle of the said hanger in order to show the wheel H in full.

The mechanism is to be operated by the foot of a person applied to its treadle or pedal, such pedal or treadle being shown at A in Fig. 1, while the driving-wheel to be actuated is represented at B as mounted on a stationary shaft, C, extended axially through it.

A pulley, D, to revolve freely on the shaft C, carries a belt, E, which at one end is fixed to the periphery of the said pulley. After being coiled several times around the pulley the belt at its lower end is attached to the pedal A.

From one side of the pulley D there is a cylindrical projection, a, which extends within and concentrically with a stationary cylindrical box, E', supported by a hanger, F. Within this box is a volute spring, G, which at or near its outer end is attached to the inner periphery of the box, the said spring near its inner end being fixed to the projection a, about which the spring is coiled. The spring is to raise the pedal after each depression of it.

Next to the pulley D there is on the shaft C concentrically a sleeve or tubular shaft, H, provided with two wheels, I K, each being angular in cross-section at its periphery, as shown. There is to each of these wheels a pawl, L or M, such pawl having a triangular notch to receive and fit to its wheel or the bevels at the periphery thereof. The pawl L, pivoted to the side of the pulley D, is pressed against the wheel I by a spring, b, fixed to the pulley. The pawl M, pivoted to the hanger O and arranged as shown, is pressed against the wheel K by a spring, c, fixed to the hanger.

Within the hub d of the wheel B is a cylindrical chamber, e, to receive a volute spring, P, which, fastened at or near its outer end to the periphery of the chamber, is coiled about the tubular shaft and secured thereto, the wheel B being to freely revolve on the stationary shaft C.

The pawl M is a retaining-pawl, its purpose with the wheel K, being to prevent the tubular shaft H from revolving backward, such shaft being revolved forward by the wheel I and pawl L when the latter is revolved with the pulley D. While the shaft H is being revolved forward, which it will be on depressing the pedal or treadle, the pawl M will readily slip on its wheel, the latter revolving with the tubular shaft. During each depression of the treadle the volute spring G will be "wound up" and the pawl L will revolve the wheel I, and thereby cause the tubular shaft to revolve and wind up the mainspring P. On the operative raising his foot, the secondary spring G will expand, and will revolve the pulley D, so as to wind the belt upon it and raise the pedal, the impelling-pawl L in the meantime slipping back on its wheel I. By the reaction of the mainspring, when the latter is wound up, the wheel B will be revolved. To this wheel there is applied a brake, R, to either stop the wheel or regulate its speed of revolution, as occasion may require, such brake being operated by the attendant.

With the above-described treadle-motion the evils of "dead-centers" of a crank when applied to the wheel-shaft and worked by a connecting-rod from the pedal are avoided, the wheel B being caused to revolve by the mainspring.

I claim—

The combination for raising the treadle A and revolving the wheel B, it consisting of the belt E, pulley D, volute spring G, tubular shaft H, wheels I K, pawls L M, and the volute mainspring P, all being arranged and applied to the shaft C, the wheel B, treadle A, and the hangers F and O, substantially and to operate as set forth.

FRED PEARLY SNOW.

Witnesses:
LORENZO POOLE,
CHARLES F. CHASE.